Sept. 15, 1964 D. W. VAN DOORN 3,149,065
APPARATUS FOR SEPARATING AIR AND TRASH FROM SEED COTTON
Filed Dec. 21, 1961 3 Sheets-Sheet 1
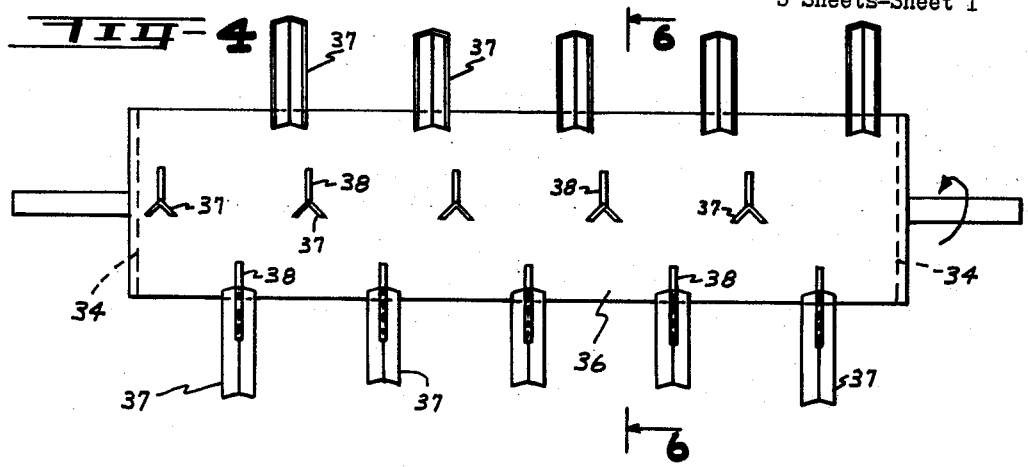
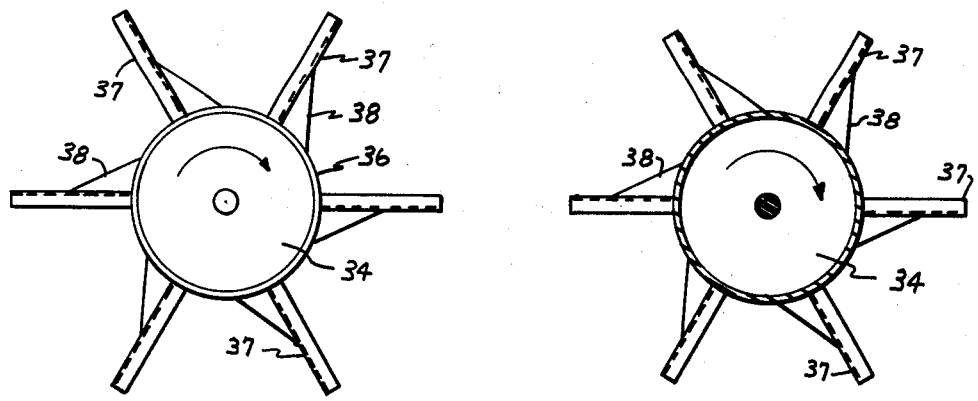
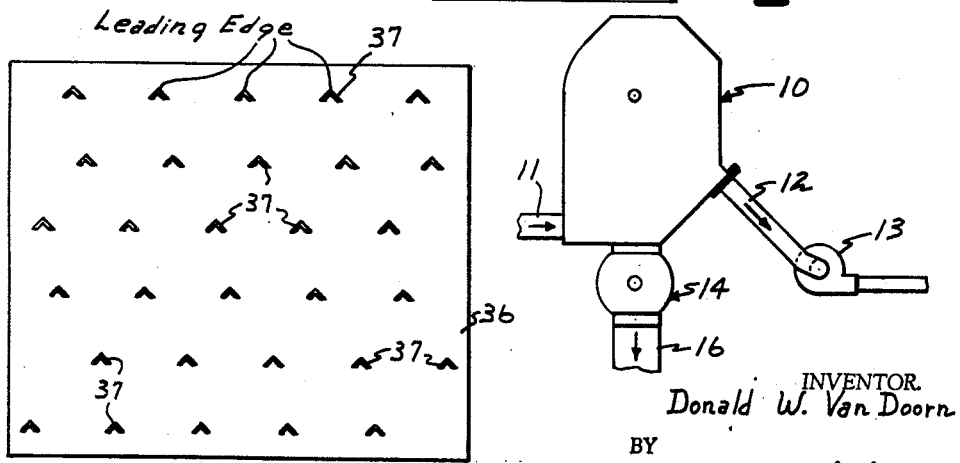
INVENTOR.
Donald W. Van Doorn
BY
Jennings Carter & Thompson
Attorneys

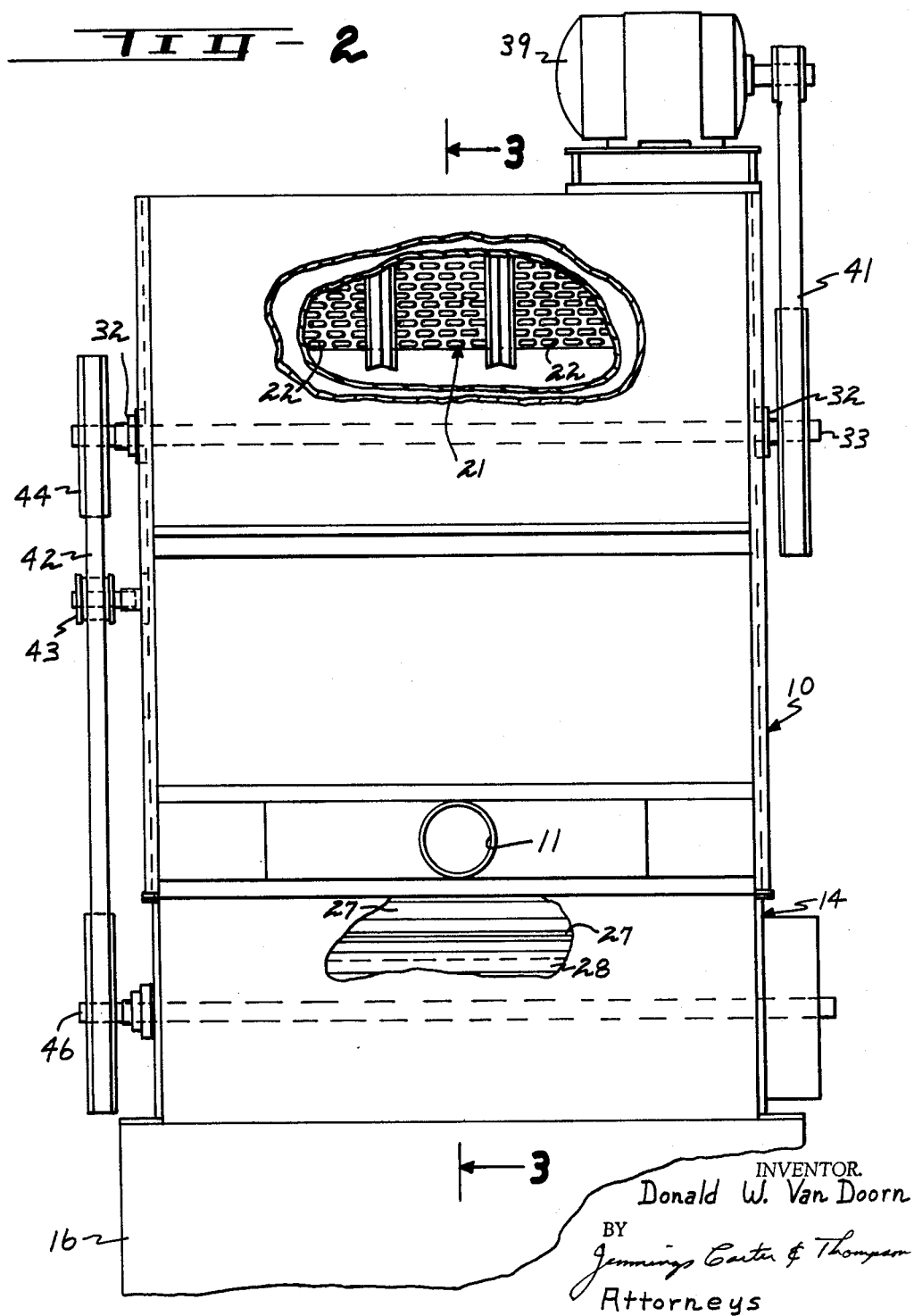

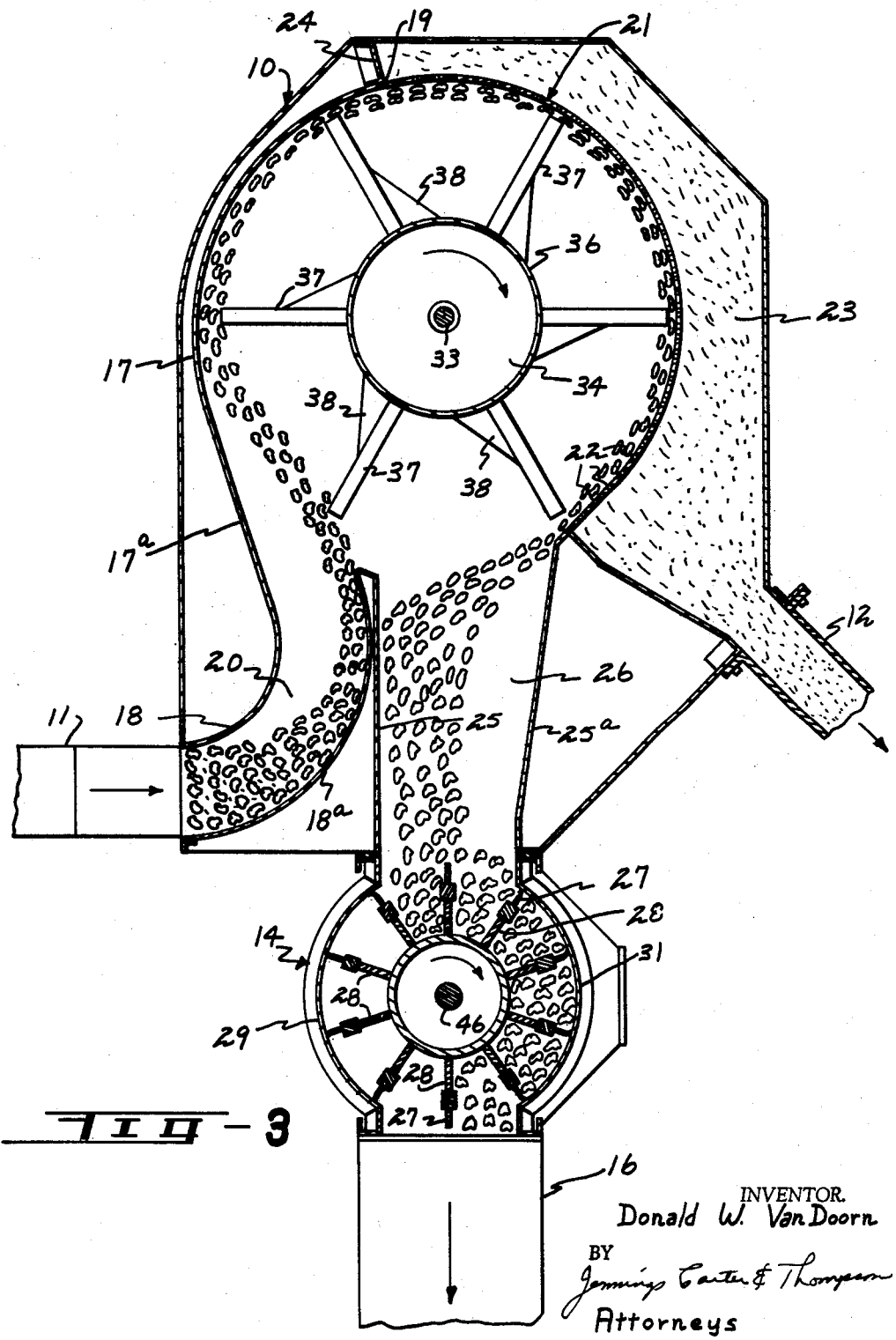

United States Patent Office 3,149,065
Patented Sept. 15, 1964

3,149,065
APPARATUS FOR SEPARATING AIR AND TRASH FROM SEED COTTON
Donald W. Van Doorn, Columbus, Ga., assignor to Lummus Cotton Gin Company, a corporation of Georgia
Filed Dec. 21, 1961, Ser. No. 160,982
5 Claims. (Cl. 209—3)

This invention relates to apparatus for separating air along with trash such as sand, fragments of leaves, dust and the like from seed cotton while enroute from the wagon to the gins.

Heretofore in this art it has been customary for seed cotton drawn from the wagons by suction to be passed through a rotary beater-like unit embodying a screen for the purpose of removing heavy trash, leaf fragments and the like. Such prior apparatus have had the disadvantage of being incapable of breaking up wads or adherent groups of locks or bolls of seed cotton, resulting in choking of the apparatus and a low order of trash separation. In some such prior apparatus the cotton has been delivered to the rotary elements at points of close clearance between the rotating members and the screen or scroll plate of the apparatus. Wads or large adherent groups of bolls or locks of cotton not only were not broken up, but such close clearance actually tended to form other wads or adherent groups of individual bolls or locks, and tended to wedge between the rotary members and the screen or scroll.

In view of the foregoing, a prime object of my invention is to overcome these difficulties by feeding the cotton into my improved apparatus comprising a rotary fan-like element having blades or cotton engaging members thereon, the cotton being delivered at a point of entry where the outer extremes of the members or blades are widely spaced from the cooperating scroll plate, thus assuring that the bunched cotton is struck by the blades while out of contact with the curved scroll plate or baffle portion leading to the curved screen, so that by the time the cotton reaches the screen itself the cotton in the stream is separated into independent, nonadherent bolls or locks and the trash is loosened for ready discharge through the screen. It should be understood that the ends of the beater arms must pass relatively close to the screen section to wipe the screen free of adhering locks of cotton and foreign matter.

Another object is to provide apparatus of the character designated in which the stream of seed cotton is fed into the casing or housing thereof and discharged therefrom at points nearer the bottom of the housing than in previous apparatus, whereby the cotton is subjected to treatment longer than in prior apparatus, increasing the cleaning efficiency for a given size unit.

Another object is to provide a separator of improved operation and efficiency having a particular arrangement of spacing of the rotary cotton engaging members and in which the length of certain of said members is decreased over the length of others thereof, all for purposes presently to appear.

Apparatus illustrating features of my invention is shown in the accompanying drawings, forming a part of this application, in which:

FIG. 1 is a wholly diagrammatic end elevational view;

FIG. 2 is an enlarged side elevational view with certain parts broken away and in section and looking at the apparatus from the inlet side thereof;

FIG. 3 is a detail sectional view taken generally along line 3—3 of FIG. 2;

FIG. 4 is a plan view of the rotary cotton engaging unit removed from the apparatus;

FIG. 5 is an end elevational view of the unit of FIG. 4;

FIG. 6 is a detail sectional view taken generally along line 6—6 of FIG. 4; and, FIG. 7 is a developed plan view of the drum of the rotary unit, illustrating the layout of the cotton engaging members carried thereby.

Referring now to the drawings for a better understanding of my invention and more particularly to FIG. 1 of the drawing my improved apparatus comprises an outer housing or casing 10 which is made substantially air-tight. Cotton is fed into the apparatus through a conduit 11, it being understood that conduit 11 is attached through the usual suction pipe so that cotton delivered to the gin house may be sucked up through the pipe and into the conduit 11 as will presently appear.

Connected to the side of the casing opposite the inlet 11 is a conduit 12 which leads to the inlet of a suction fan 13 driven by any suitable means, not shown. It is through the conduit 12 and the suction fan 13 that the trash removed from the cotton is discharged.

Secured in air-tight manner to the bottom of the housing 10 is a vacuum wheel or drop seal feeder illustrated at 14 and which is driven as will be explained. It is through the drop seal feeder and thence to a conduit 16 that the cleaned cotton is discharged from my improved apparatus.

Referring particularly to FIGS. 2 and 3, it will be seen that inside the casing I provide a scroll plate 17 which is connected through a straight section 17ª to the conduit 11 by a reversely curved lower end or section 18, thus to provide the outer wall of a cotton inlet 20. A curved wall 18ª forms the inner wall of the inlet 20. It will further be noted that the inlet 20 extends inwardly of the confines of the housing 10, beneath the scroll plate 17.

The scroll plate connects substantially tangentially at 19 to a curved screen 21 which may be in the form of a perforated plate with horizontally elongated openings 22 therein. See FIG. 2. It will be further noted that the housing defines with the screen 21 a suction chamber 23 which is stopped off or baffled by an axially extending plate 24. The suction pipe 12 thus is in communication with the chamber 23 and, through the openings in the screen 21, with the inlet 11.

The upper end of the curved wall 18ª and the lower end of the screen 21 are joined to walls 25 and 25ª which define a conduit 26 to the vacuum wheel or drop seal feeder 14, in air-tight manner. It will be understood that the drop seal feeder has flexible wiping elements 27 carried by the ends of the arms 28 thereof which engage the curved plates 29 and 31. Thus, the cleaned cotton to be discharged from the treating chamber of the apparatus and falling down through the conduit or passage 26 is dropped from the machine without the admission of air, by reason of drop seal feeder 14.

Mounted on suitable bearings 32 located at the geometric center of the scroll plate 17 and screen 21 is a shaft 33. At each end of the shaft are discs 34 to which is secured an axially elongated cylindrical drum 36 extending substantially the length of the apparatus.

Mounted on the periphery of the drum are a plurality of cotton engaging members 37. The members 37 may be in the form of angles with the apices thereof pointed in the direction of rotation of the drum. The angles may be fastened to the drum 36 by means of knee brace plates 38 secured to the leading edges thereof and to the drum 36 as by welding. In FIGS. 5 and 6 it will be noted that certain ones of the members 37 are shorter in length than some of the others. Thus, the members 37 located adjacent the center or intermediate the length of the drum 36 are shorter than those located adjacent the ends of the drum. Further, by consideration of FIG. 7 it will be seen that the members are laid out on the periphery of the drum in such manner that they are staggered, whereby the cotton, over the entire length of the drum, is subjected to the action of the rotating members 37. As illustrated in the drawings each row of the members 37, considered axially of the drum, may consist of five of the members. Preferably, the end ones of each row are longer than the three remaining intermediate ones. By way of example, if the end angles are 11⅜ inches long, the intermediate ones may be 9⅞ inches long. I have found that this arrangement of the cotton engaging members not only tends to eliminate choking, but also increases the cleaning efficiency of the apparatus.

As shown in FIG. 2, I provide an electric motor 39 which may be mounted on top of the housing 10. The motor drives the shaft 33 through a belt 41. A belt 42 passing over an idler 43 and over a pulley 44 on the opposite end of shaft 33 may drive the shaft 46 of the drop seal feeder 14.

From the foregoing the method of constructing and using my improved apparatus together with the advantages thereof may now be explained and understood. With suction being applied by means of the suction fan 13, the cotton directly from the wagons is drawn up through the usual pipe into the conduit 11. The cotton strikes the upwardly and reversely curved wall 18a of inlet 20 and enters the zone of contact of the rotary members 37 in a condition spaced from the portion 17a which connects the scroll 17 with the wall 18. Wads or adherent groups of cotton locks or bolls thus are struck by the upwardly moving, rotating members 37 while such wads in effect are suspended in the air, out of contact with the wall 17a and 17. Such adherent groups of bolls or locks are effectively broken up and the trash, sand and the like therein is effectivey loosened. As the cotton moves upwardly around the scroll 17, which it will be noted also gets progressively closer to the outer ends of the members 37, it reaches the screen 21 and thereby is subjected to the flow of air due to the suction being applied to the compartment 23. As the cotton moves around the screen it is fully agitated and shaken or beaten by the members 37, aiding in the suction of the trash through the screen and its consequent discharge through the blower 13. The cotton now drops by gravity into the drop seal feeder 14 where it is discharged into a suitable conduit 16 for subsequent treatment or delivery to the gins.

It is to be particularly noted that the cotton is first engaged by the members 37 while it is out of contact with walls, screens or the like. It is this "inflight" striking of the cotton which aids both to break up the cotton into separate bolls or locks and prevent the choking of the machine by the engagement of such wads or groups between the ends of the beater members 37 and the wall of the treatment chamber. Furthermore, it will be noted that the reversely curved inlet section 20 lies inwardly of the confines of the outer diameter of the scroll plate 17 and that the discharge 26 is located substantially beneath the center of the apparatus. The cotton thus is subjected to more treatment in my improved apparatus than if it were admitted to the machine near the top of the curved treatment section.

In actual operation my improved apparatus has been found to be extremely practical and efficient. It is particularly useful in removing sand, dust, leaf particles and the like from seed cotton as it moves from the wagons enroute to the gins.

While I have shown my invention in but one form, it will be obvious to those skilled in the art that it is not so limited, but is susceptible of various changes and modifications without departing from the spirit thereof, and I desire therefore, that only such limitations shall be placed thereupon as are specifically set forth in the appended claims.

What I claim is:

1. In apparatus for separating air and trash from seed cotton and the like, (a) a generally cylindrical treating chamber defined by an arcuate wall having perforate and imperforate sections, the perforations being of a size to pass trash and small enough to retain cotton,
   (b) a rotary beater element embodying a plurality of cotton engaging blades mounted for rotation with the ends of the blades running in close proximity to the perforated part of the arcuate wall,
   (c) a downwardly and inwardly directed wall joined to the end of the imperforate portion of the arcuate wall and then curving outwardly, thereby defining the outer wall of an inlet chamber for cotton to be delivered to the treating chamber,
   (d) a spaced complementarily curved wall defining the other side of the inlet for said cotton terminating beneath the paths of the ends of said arms, said wall joined to the imperforate part of the arcuate wall being spaced from the circumferential paths described by the ends of said arms of the rotary beater element to the extent that cotton delivered through the inlet enters the zones between adjacent blades and is struck by the blades while out of contact with all of said walls,
   (e) a discharge outlet for the cleaned cotton located at the bottom of the cylindrical treating chamber,
   (f) an air-tight casing spaced from the perforate portion of the arcuate wall and defining a suction chamber,
   (g) means to apply suction to the suction chamber sufficient to induce a flow of cotton into the inlet through the chamber and to draw trash through the perforated portion of the arcuate wall,
   (h) vacuum wheel discharge means located at the bottom of said outlet,
   (i) and means to rotate the rotary beater element and the vacuum wheel.

2. Apparatus as defined in claim 1 in which the cotton engaging blades are in the form of angle members with their apices pointed in the direction of rotation of said rotary member.

3. Apparatus as defined in claim 4 in which the angle members are laid out in staggered rows about the periphery of said rotary element and in which the angle members at the ends of said rows are longer than those intermediate the end ones.

4. In apparatus for removing sand and the like from seed cotton as the commingled sand and cotton are moving along in a stream, (a) a generally cylindrical treating chamber defined by a curved wall, that portion of the wall on the inlet side of said apparatus as hereinafter defined being unperforated and the remainder being perforated to pass the sand,
   (b) a rotary cotton engaging member having blades thereon which travel in close proximity to the inner surface of the perforated portion of the cylindrical chamber,
   (c) an inwardly and upwardly curved inlet for the cotton to be treated located beneath the imperforate portion of the arcuate wall of the chamber and defined by inner and outer curved walls,
   (d) an imperforate wall tangentially connected to the upper end of the outer curved wall of the inlet and to the lower end of the imperforate wall of the cylindrical treating chamber, said connecting wall being spaced from the circumferential paths described by the ends of the blades of the rotary cotton engaging members a distance sufficient for the blades to engage the stream of cotton while the stream is in free flight between the upper end of the inlet section and the curved portion of the walls of the treating chamber, the zones between said blades being in flow communication with the seed cotton being delivered to the inlet whereby wads or lumps of cotton fed to the apparatus are broken up by the blades prior to the stream of cotton reaching the curved walls of the treating chamber,
(e) an outlet for the cleaned seed cotton located substantially directly below the center of the chamber and defined by a pair of imperforate walls,
(f) vacuum wheel discharge mechanism located at the lower end of the outlet,
(g) means defining a suction chamber about the perforated portion of the treatment chamber,
(h) and means to maintain the suction chamber and hence the interior of the treatment chamber under sub-atmospheric pressure sufficient to draw trash through the perforated wall as the seed cotton moves around the inside thereof.

5. In apparatus for separating air and trash from seed cotton and the like,
(a) a cleaning chamber defined by an arcuate wall at least a part of which is perforated to pass trash,
(b) a rotary driven unit located substantially at the center of the chamber and embodying a plurality of cotton engaging blades with the free ends thereof operating in close proximity to the arcuate wall of the chamber,
(c) an inwardly and downwardly directed wall tangentially connected at its upper end to the arcuate wall on one side of the chamber and having a lower outwardly curved end defining one wall of a cotton inlet for the chamber,
(d) a wall curved complementarily to said one wall and forming the second wall of the cotton inlet and located inwardly of the first wall,
(e) said inwardly and downwardly directed wall being spaced farther from the circumferential paths described by the ends of said blades of the rotary unit at its lower end than at the point where it joins said arcuate wall and the zones between adjacent blades being in flow communication with the seed cotton introduced through the feed inlet, whereby cotton delivered upwardly through the inlet is engaged by the blades while in free flight just after entering the chamber,
(f) means to rotate the blades in a direction to lift cotton fed through the inlet and carry it around over the arcuate wall of the chamber,
(g) means to apply suction to the perforated part of the chamber, whereby trash is drawn therethrough,
(h) means to supply seed cotton to be cleaned to the inlet, and
(i) means to discharge the seed cotton from the chamber.

References Cited in the file of this patent
UNITED STATES PATENTS

| | | |
|---|---|---|
| 520,315 | Jackson | May 22, 1894 |
| 641,869 | Klock | Jan. 25, 1900 |
| 1,009,576 | Riemenschneider | Nov. 21, 1911 |
| 2,696,025 | Vandergriff | Dec. 7, 1954 |